US007441062B2

(12) United States Patent
Novotney et al.

(10) Patent No.: US 7,441,062 B2
(45) Date of Patent: Oct. 21, 2008

(54) CONNECTOR INTERFACE SYSTEM FOR ENABLING DATA COMMUNICATION WITH A MULTI-COMMUNICATION DEVICE

(75) Inventors: Donald J. Novotney, San Jose, CA (US); John Benjamin Filson, Sn Jose, CA (US); David Tupman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 386 days.

(21) Appl. No.: 10/833,689

(22) Filed: Apr. 27, 2004

(65) Prior Publication Data

US 2005/0240705 A1 Oct. 27, 2005

(51) Int. Cl.
*G06F 13/00* (2006.01)
(52) U.S. Cl. .......................... 710/303; 710/64; 710/72; 710/16
(58) Field of Classification Search ......... 710/300–315, 710/8–19, 62–74; 713/300–310, 324–340; 439/609; 725/153, 134; 369/2–6
See application file for complete search history.

(56) References Cited

U.S. PATENT DOCUMENTS

| 4,673,861 | A | 6/1987 | Dubovsky et al. |
| 4,850,899 | A | 7/1989 | Maynard |
| 5,041,025 | A | 8/1991 | Haitmanek |
| 5,055,069 | A | 10/1991 | Townsend et al. |
| 5,080,603 | A | 1/1992 | Mouissie |
| 5,104,243 | A | 4/1992 | Harding |
| 5,108,313 | A | 4/1992 | Adams |
| 5,150,031 | A | 9/1992 | James et al. |
| 5,186,646 | A | 2/1993 | Pederson |
| 5,277,624 | A | 1/1994 | Champion |
| 5,471,128 | A | 11/1995 | Patino et al. |

(Continued)

FOREIGN PATENT DOCUMENTS

EP 1 104 150 5/2001

(Continued)

OTHER PUBLICATIONS

Lewis, Peter, "On Technology," *Fortune Magazine*, Dec. 9, 2002.

(Continued)

*Primary Examiner*—Raymond N Phan
(74) *Attorney, Agent, or Firm*—Townsend and Townsend and Crew LLP

(57) ABSTRACT

A connector interface system a communication device is disclosed. The interface includes a docking connector. The docking connector includes first make/last break contacts that minimize internal damage to the internal electronics. The docking connector also includes specific keying arrangement to prevent noncompliant connectors from being plugged in, and thereby minimizes potential damage to the multi-communication device. The connector interface system also includes a remote connector which provides for the ability to output audio, input audio, provides I/O serial protocol, and to provide an output video. Heretofore, all these features have not been implemented in a connector. Therefore, this would allow for a standard headphone cable to be plugged in but also for special remote control cables, microphone cables, video cables could be utilized in such a system. The connector interface system also includes a serial protocol to control device features. These controls help a user sort and search for data more efficiently within the device.

23 Claims, 5 Drawing Sheets

U.S. PATENT DOCUMENTS

| | | | |
|---|---|---|---|
| 5,586,893 A | 12/1996 | Mosquera | |
| 5,618,045 A | 4/1997 | Kagan et al. | |
| 5,648,712 A | 7/1997 | Hahn | |
| 5,660,558 A | 8/1997 | Osanai et al. | |
| 5,727,866 A * | 3/1998 | Kraines et al. | 362/86 |
| 5,754,027 A | 5/1998 | Oglesbee et al. | |
| 5,830,001 A | 11/1998 | Kinoshita | |
| 5,845,217 A | 12/1998 | Lindell et al. | |
| 5,901,049 A | 5/1999 | Schmidt et al. | |
| 5,975,957 A | 11/1999 | Noda et al. | |
| 6,012,105 A | 1/2000 | Rubbmark et al. | |
| 6,031,797 A * | 2/2000 | Van Ryzin et al. | 369/30.28 |
| 6,053,773 A | 4/2000 | Wu | |
| 6,125,455 A | 9/2000 | Yeo | |
| 6,130,518 A | 10/2000 | Gabehart et al. | |
| 6,139,373 A * | 10/2000 | Ward et al. | 439/733.1 |
| 6,154,773 A * | 11/2000 | Roberts et al. | 709/219 |
| 6,154,798 A * | 11/2000 | Lin et al. | 710/72 |
| 6,169,387 B1 | 1/2001 | Kaib | |
| 6,184,652 B1 | 2/2001 | Yang | |
| 6,184,655 B1 | 2/2001 | Malackowski | |
| 6,203,345 B1 | 3/2001 | Roque et al. | |
| 6,204,637 B1 | 3/2001 | Rengan | |
| 6,206,480 B1 | 3/2001 | Thompson | |
| 6,211,581 B1 | 4/2001 | Farrant | |
| 6,211,649 B1 | 4/2001 | Matsuda | |
| 6,224,420 B1 | 5/2001 | Nishio et al. | |
| 6,230,205 B1 | 5/2001 | Garrity et al. | |
| 6,234,827 B1 | 5/2001 | Nishio et al. | |
| 6,252,380 B1 | 6/2001 | Koenck | |
| 6,261,109 B1 | 7/2001 | Liu et al. | |
| 6,267,623 B1 | 7/2001 | Hisamatsu | |
| 6,271,605 B1 | 8/2001 | Carkner et al. | |
| 6,280,251 B1 | 8/2001 | Nishio et al. | |
| 6,283,789 B1 | 9/2001 | Tsai | |
| 6,304,764 B1 | 10/2001 | Pan | |
| 6,314,479 B1 | 11/2001 | Frederick et al. | |
| 6,316,916 B2 | 11/2001 | Bohne | |
| 6,319,061 B1 | 11/2001 | Chen et al. | |
| 6,322,396 B1 | 11/2001 | Kuan | |
| 6,344,727 B1 | 2/2002 | Desai et al. | |
| 6,353,894 B1 | 3/2002 | Pione | |
| 6,354,713 B1 | 3/2002 | Leifer et al. | |
| 6,358,089 B1 | 3/2002 | Kuroda et al. | |
| 6,385,596 B1 | 5/2002 | Wiser et al. | |
| 6,431,915 B1 | 8/2002 | Ko | |
| 6,453,371 B1 | 9/2002 | Hampson et al. | |
| 6,454,592 B2 | 9/2002 | Takagi | |
| 6,461,173 B1 | 10/2002 | Mizuno et al. | |
| 6,464,542 B1 | 10/2002 | Lee | |
| 6,468,110 B2 | 10/2002 | Fujino et al. | |
| 6,478,603 B1 | 11/2002 | Wu | |
| 6,483,428 B1 * | 11/2002 | Fish et al. | 340/425.5 |
| 6,485,328 B1 | 11/2002 | Wu | |
| 6,489,751 B2 | 12/2002 | Small et al. | |
| 6,524,119 B2 | 2/2003 | Kato et al. | |
| 6,577,877 B1 | 6/2003 | Charlier et al. | |
| 6,589,076 B1 | 7/2003 | Davis et al. | |
| 6,591,085 B1 | 7/2003 | Grady | |
| 6,608,264 B1 | 8/2003 | Fouladpour | |
| 6,608,399 B2 * | 8/2003 | McConnell et al. | 307/10.1 |
| 6,614,232 B1 | 9/2003 | Mukai | |
| 6,616,473 B2 | 9/2003 | Kamata et al. | |
| 6,629,197 B1 * | 9/2003 | Bhogal et al. | 711/111 |
| 6,642,629 B2 * | 11/2003 | DeLeeuw | 307/10.1 |
| 6,653,813 B2 | 11/2003 | Khatri | |
| 6,663,420 B1 | 12/2003 | Xiao | |
| 6,674,995 B1 | 1/2004 | Meyers et al. | |
| 6,725,061 B1 | 4/2004 | Hutchison et al. | |
| 6,728,546 B1 | 4/2004 | Peterson et al. | |
| 6,754,468 B1 | 6/2004 | Sieben et al. | |
| 6,776,626 B2 | 8/2004 | Huang et al. | |
| 6,776,660 B1 | 8/2004 | Kubota et al. | |
| 6,776,665 B2 | 8/2004 | Huang | |
| 6,799,226 B1 | 9/2004 | Robbin et al. | |
| 6,813,528 B1 | 11/2004 | Yang | |
| 6,816,376 B2 | 11/2004 | Bright et al. | |
| 6,830,160 B2 * | 12/2004 | Risolia | 221/3 |
| 6,859,854 B2 | 2/2005 | Kwong | |
| 6,931,456 B2 | 8/2005 | Payne et al. | |
| 6,939,177 B2 | 9/2005 | Kato et al. | |
| 6,991,483 B1 | 1/2006 | Milan et al. | |
| 7,004,787 B2 | 2/2006 | Milan | |
| 7,050,783 B2 | 5/2006 | Curtiss et al. | |
| 7,062,261 B2 * | 6/2006 | Goldstein et al. | 455/419 |
| 7,108,560 B1 * | 9/2006 | Chou et al. | 439/660 |
| 7,127,678 B2 | 10/2006 | Bhesania et al. | |
| 7,127,879 B2 | 10/2006 | Zhu et al. | |
| 7,215,042 B2 * | 5/2007 | Yan | 307/116 |
| 2001/0003205 A1 | 6/2001 | Gilbert | |
| 2001/0005641 A1 | 6/2001 | Matsumoto et al. | |
| 2001/0006884 A1 | 7/2001 | Matsumoto | |
| 2002/0002035 A1 | 1/2002 | Sim et al. | |
| 2002/0010759 A1 | 1/2002 | Hitson et al. | |
| 2002/0029303 A1 | 3/2002 | Nguyen | |
| 2002/0065074 A1 | 5/2002 | Cohn et al. | |
| 2002/0068610 A1 | 6/2002 | Anvekar et al. | |
| 2002/0072390 A1 | 6/2002 | Uchiyama | |
| 2002/0103008 A1 | 8/2002 | Rahn et al. | |
| 2002/0105861 A1 | 8/2002 | Leapman | |
| 2002/0115480 A1 | 8/2002 | Huang | |
| 2002/0132651 A1 | 9/2002 | Jinnouchi | |
| 2002/0151327 A1 | 10/2002 | Levitt | |
| 2002/0152874 A1 | 10/2002 | Vilcauskas et al. | |
| 2002/0156546 A1 | 10/2002 | Ramaswamy | |
| 2002/0156949 A1 | 10/2002 | Kubo et al. | |
| 2002/0173273 A1 | 11/2002 | Spurgat et al. | |
| 2003/0028664 A1 | 2/2003 | Tan et al. | |
| 2003/0041206 A1 | 2/2003 | Dickie | |
| 2003/0059022 A1 | 3/2003 | Nebiker et al. | |
| 2003/0067741 A1 | 4/2003 | Alfonso et al. | |
| 2003/0073432 A1 | 4/2003 | Meade | |
| 2003/0079038 A1 | 4/2003 | Robbin et al. | |
| 2003/0097379 A1 | 5/2003 | Ireton | |
| 2003/0110403 A1 | 6/2003 | Crutchfield et al. | |
| 2003/0172209 A1 | 9/2003 | Liu et al. | |
| 2003/0198015 A1 | 10/2003 | Vogt | |
| 2003/0220988 A1 * | 11/2003 | Hymel | 709/220 |
| 2003/0236075 A1 | 12/2003 | Johnson et al. | |
| 2004/0019497 A1 | 1/2004 | Volk et al. | |
| 2004/0039860 A1 | 2/2004 | Mills et al. | |
| 2004/0048569 A1 | 3/2004 | Kawamura | |
| 2004/0090998 A1 | 5/2004 | Chen | |
| 2004/0103223 A1 * | 5/2004 | Gebehart et al. | 710/2 |
| 2004/0162029 A1 | 8/2004 | Grady | |
| 2004/0186935 A1 | 9/2004 | Bel et al. | |
| 2004/0194154 A1 * | 9/2004 | Meadors et al. | 725/153 |
| 2004/0198436 A1 | 10/2004 | Alden | |
| 2004/0224638 A1 * | 11/2004 | Fadell et al. | 455/66.1 |
| 2004/0235339 A1 | 11/2004 | Sato et al. | |
| 2004/0267825 A1 | 12/2004 | Novak et al. | |
| 2005/0014119 A1 * | 1/2005 | Rudakov | 434/350 |
| 2005/0014531 A1 | 1/2005 | Findikli | |
| 2005/0014536 A1 | 1/2005 | Grady | |
| 2005/0022212 A1 | 1/2005 | Bowen | |
| 2005/0207726 A1 * | 9/2005 | Chen | 386/46 |
| 2005/0239333 A1 | 10/2005 | Watanabe et al. | |
| 2006/0184456 A1 | 8/2006 | de Janasz | |
| 2007/0086724 A1 * | 4/2007 | Grady et al. | 386/46 |

FOREIGN PATENT DOCUMENTS

| | | |
|---|---|---|
| EP | 1672613 A2 | 6/2006 |
| GB | 2405718 A | 3/2005 |

| | | |
|---|---|---|
| JP | 10-321302 | 12/1998 |
| JP | 10-334993 | 12/1998 |
| JP | 11-288420 | 10/1999 |
| JP | 2000-214953 | 8/2000 |
| JP | 2000-223216 | 8/2000 |
| JP | 2000-223218 | 8/2000 |
| JP | 2001-035603 | 2/2001 |
| JP | 2001-069165 A | 3/2001 |
| JP | 2001-196133 | 7/2001 |
| JP | 2001-230021 | 8/2001 |
| JP | 2001-332350 | 11/2001 |
| JP | 2002-025720 | 1/2002 |
| JP | 2002-203641 | 7/2002 |
| JP | 2002 245719 | 8/2002 |
| JP | 2002-252566 | 9/2002 |
| JP | U3090747 | 10/2002 |
| JP | 2002-342659 | 11/2002 |
| JP | 2002-374447 | 12/2002 |
| JP | 2003-17165 | 1/2003 |
| JP | 2003-032351 | 1/2003 |
| JP | 2003-274386 | 9/2003 |
| WO | WO 99/26330 | 5/1999 |
| WO | WO 00/39907 | 7/2000 |
| WO | WO 00/60450 | 10/2000 |
| WO | WO 02/49314 | 6/2002 |
| WO | WO 03/036541 A1 | 5/2003 |
| WO | WO 03/036957 A1 | 5/2003 |
| WO | WO 03/073688 | 9/2003 |
| WO | WO 2004/084413 | 9/2004 |
| WO | WO 2005/119463 A2 | 12/2005 |

OTHER PUBLICATIONS

"ipodDock/iPod Cradle," www.bookendzdocks.com/bookendz/dock_cradle.htm, dowloaded Feb. 27, 2003.
"Neuros MP3 Digital Audio Computer," www.neurosaudio.com, dowloaded Apr. 9, 2003.
Sinitsyn, Alexander, "Synchronization Framework For Personal Mobile Servers," *Pervasive Computing and Communications Workshops* (PERCOMW'04), Proceedings of the Second IEEE Annual Conference, Piscataway, NJ, USA, IEEE, Mar. 14, 2004, pp. 208-212.
Bindra, Ashok, "Standard Turns Monitor into I/O Hub," *Electronic Engineering Times*, vol. 918, Sep. 6, 1996, p. 14.
International Search Report dated Aug. 20, 2004, from PCT Application No. PCT/US2004/08686.
International Search Report dated May 21, 2007, from PCT Application No. PCT/US2006/048670.
Belkin iPod Voice Recorder, Product Specification Sheet, printed Jun. 16, 2004.
Brentrup, "Introduction to Public Key Cryptography Demystified," Campus Technology, printed from http://www.campus-technology.com/article.asp?id=7626 on Oct. 6, 2004.
"Cables to Go," download Oct. 16, 2001 http://www.cablestogo.com/product.asp?cat%5Fid=601&sku=27028.
Derman, Glenda, "Monitors Make Net Connections," *Electronic Engineering Times*, vol. 933, 1996, pp. 60 and 69.
"ExpressBus™ FUOI 0 User Guide Packing Checklist", Belkin Components.
"Fire Wire Connector", downloaded Oct. 16, 2001, wysiwyg:/176/http://developer.apple.com/...es/Macintosh CPUs_G3/ibook/ibook-27.html.
"FireWire", downloaded Oct. 16, 2001, si_wyg://42/http://developer.apple.comlhardwarelFire_Wire.
Fried, "FireWire poised to become ubiquitous", downloaded Oct. 16, 2001, CNET News.com, 1394 Trade Association: Press, wysiwyg:/132/http:/ 11394ta.org/Press/200 1 Press/august!8.27.b.html.
Fried, "New Fire Wire to blaze faster trail" , downloaded Oct. 16, 2001, CNET News.com, http://news.cnet.com/news/0-l006-200-6021210.html.
"How to Connect Your Computer, PC Hardware", downloaded Oct. 16, 2001, http:///www.scar.utoronto.ca!~ccweb/faculty/connect-howto.html.
"IEEE 1394/USB Comparison", downloaded Oct. 16, 2001, www.genitech.com.aulLIBRARY/TechSupportiinfobits/firewirevsusb.htm.
"Introduction to Public Key Cryptography," Oct. 9, 1998, printed from http://developer.netscape.com/docs/manuals/security/pkin/contents.htm on Oct. 6, 2004.
"Making USB Work", downloaded Oct. 16, 2001, PC Magazine: PC Tech wysiwyg:/ 15 5/http://www.zdnet.com/pcmag/pctech/content!18/04/tu_1804.001.html.
Menezes et al., "Handbook of Applied Cryptography," Identification and Entity Authentication, pp. 385-424.
"MVP Music Profile Specification Revision 1.00" Internet Citation ]online] (Jan. 7, 2004) URL:http//www.osta.org/mpv/public/specs/MPVMusic-Prof-Spec-1.00.pdf>[retrieved Jun. 20, 2006] the whole document.
"PMC FW2 IEEE 1394 FireWire Controller", downloaded Oct. 16, 2001, http://www.bvmltd.co.uk/PMCfw2ds.html.
Whittle, "Public Key Authentication Framework: Tutorial," First Principles Consulting, Jun. 2, 1996.
"Why FireWire is Hot!Hot!Hot!", downloaded Oct. 16, 2001, "Impact.Fire Wire. SideBar" http://www.vxm.com/21R.35.html.

* cited by examiner 3.1 CONNECTOR PIN DESIGNATIONS:
3.1.1 OMNI: JAE DDI 30 pin connector series

| Pin | Signal name | I/O | Function |
| --- | --- | --- | --- |
| 1 | F/W GND | I | Firewire and charger ground |
| 2 | F/W GND | I | Firewire and charger ground |
| 3 | TPA+ | I/O | Firewire signal |
| 4 | USB D+ | I/O | USB signal |
| 5 | TPA- | I/O | Firewire signal |
| 6 | USB D- | I/O | USB signal |
| 7 | TPB+ | I/O | Firewire signal |
| 8 | USB PWR | I | USB power in. NOT for powering; only to detect USB host |
| 9 | TPB- | I/O | Firewire signal |
| 10 | Accessory Identify | I | Pull down in dock to notify iPod of specific device |
| 11 | F/W PWR+ | I | Firewire and charger input power (8V to 30V dc) |
| 12 | F/W PWR+ | I | Firewire and charger input power (8V to 30V dc) |
| 13 | ACCESSORY PWR(3V3) | O | 3.3V output from iPod. Current limited to 100mA. |
| 14 | Reserved | | |
| 15 | USB GND | GND | Digital ground in iPod |
| 16 | DGND | GND | Digital ground in iPod |
| 17 | Reserved | | |
| 18 | Dock Tx | I | Serial protocol (Data to iPod) |
| 19 | Dock Rx | O | Serial protocol (Data from iPod) |
| 20 | Accessory Detect | I/O | |
| 21 | Reserved | | |

| Pin | Signal name | I/O | Function |
| --- | --- | --- | --- |
| 22 | Reserved | | |
| 23 | Reserved | | |
| 24 | Reserved | | |
| 25 | LINE-IN L | I | Line level input to the iPod for the left channel |
| 26 | LINE-IN R | I | Line level input to the iPod for the right channel |
| 27 | LINE-OUT L | O | Line level output to the iPod for the left channel |
| 28 | LINE-OUT R | O | Line level output to the iPod for the right channel |
| 29 | Audio Return | GND | Audio return - Singal, never to be grounded inside accessory |
| 30 | DGND | GND | Digital ground iPod |
| 31 | Chassis | | Chassis ground for connector shell |
| 32 | Chassis | | Chassis ground for connector shell |

FIG.3A 3.1.2 AUDIO/REMOTE: 8 pin Foxconn Apple Custom

| Pin | Signal name | I/O | Function |
|---|---|---|---|
| 1 | Audio Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Reserved | | |
| 6 | Accessory 3.3V | O | 3.3V Accessory power 100mA max |
| 7 | Tx | O | Serial protocol (Data from iPod to Device) |
| 8 | Rx | I | Serial protocol (Data to iPod from Device) |
| 9 | D GND | GND | Digital ground for accessory |

FIG.3B

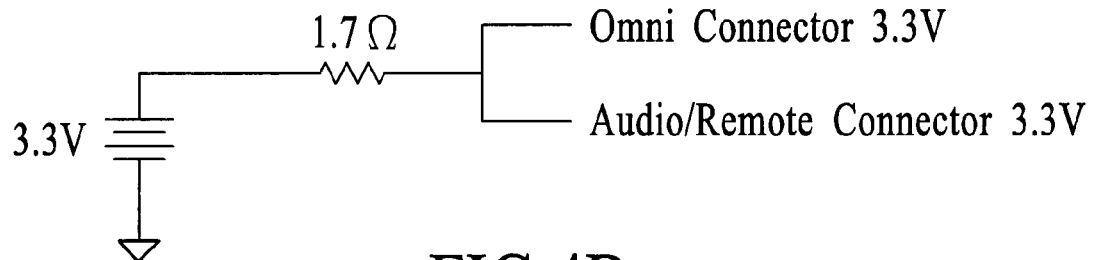

FIG.4B

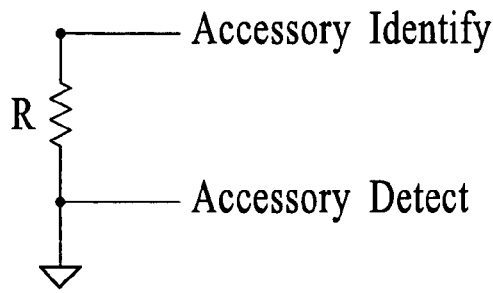

FIG.4C

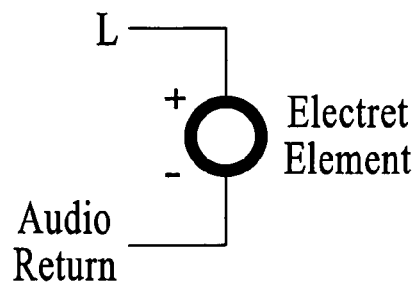

FIG.4D

CONNECTOR INTERFACE SYSTEM FOR ENABLING DATA COMMUNICATION WITH A MULTI-COMMUNICATION DEVICE

FIELD OF THE INVENTION

The present invention relates generally to multi-communication devices and more particularly to a connector interface system for such devices.

BACKGROUND OF THE INVENTION

Multi-communication devices are utilized in a variety of environments. What is meant by a multi-communication device is a device such as MP3 player, or other type of device that receives video, audio, and a variety of other digital data and can provide an output of the data. As these devices proliferate, a connector interface specification becomes more important, and also insuring that a particular multi-communications device interfaces appropriately with the appropriate external devices becomes more important.

In a typical connector interface, there is a docking connector that allows for the docking of the multi-communications device to a docking station for another type of communication for the device. A multi-communication device also typically includes a remote connector with the ability to output audio. As more multi-media content becomes available (i.e., digital video graphics, etc.) it is desirable to have a multi-media device which can effectively input and output such data.

Finally, such an interface typically has some sort of protocol to control device features from an external device and it also is desirable for the protocol to help the user sort and search for data faster and in an efficient manner. Heretofore, there is no device that includes features that overcome many of the above-stated problems. What is desired is a connector interface system which is utilized in such a device to address all the above-identified issues. The present invention addresses such a need.

SUMMARY OF THE INVENTION

A connector interface system for a communication device is disclosed. The interface includes a docking connector. The docking connector includes first make/last break contacts that minimize internal damage to the internal electronics. The docking connector also includes specific keying arrangement to prevent noncompliant connectors from being plugged in, and thereby minimizes potential damage to the multi-communication device. The connector interface system also includes a remote connector which provides for the ability to output audio, input audio, and output video using I/O serial protocol. Heretofore, all these features have not been implemented in a connector. Therefore, this would allow for a standard headphone cable to be plugged in but also for special remote control cables, microphone cables, video cables to be utilized in such a system. The connector interface system also includes a serial protocol to control device features. These controls help a user sort and search for data more efficiently within the device.

BRIEF DESCRIPTION OF THE DRAWINGS

FIG. 3A illustrates the connection pin designations for the docking connector.

FIG. 3B illustrates the connection pin designations for the remote connector.

FIG. 4B illustrates the USB connector interface.

FIG. 4C illustrates a reference schematic diagram for accessory detect and identify system for detecting and identifying accessories for the docking connector.

FIG. 4D is a reference schematic of an electret microphone that is within the remote connector.

DETAILED DESCRIPTION

The present invention relates generally to multi-communication devices and more particularly to a connector interface system for such devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Connector System Overview

To describe the features of the connector system in accordance with the present invention in more detail, refer now to the following description in conjunction with the accompanying drawings.

Docking Connector

Figure 1A:
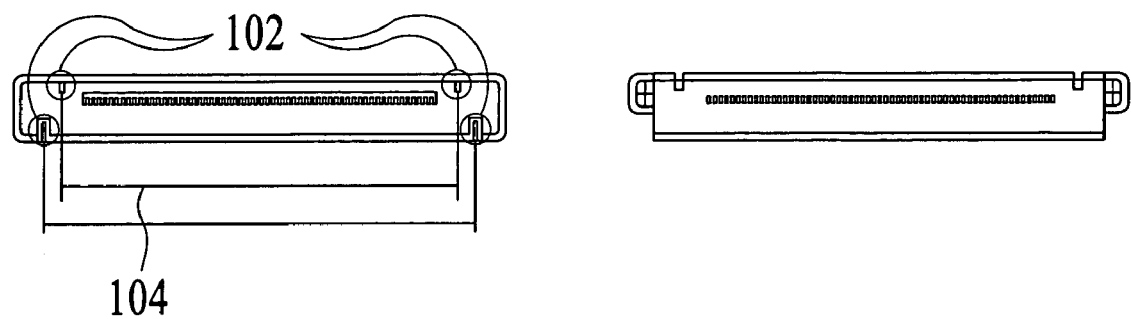
FIGS. 1A and 1B illustrate a docking connector in accordance with the present invention.
Figure 1B:
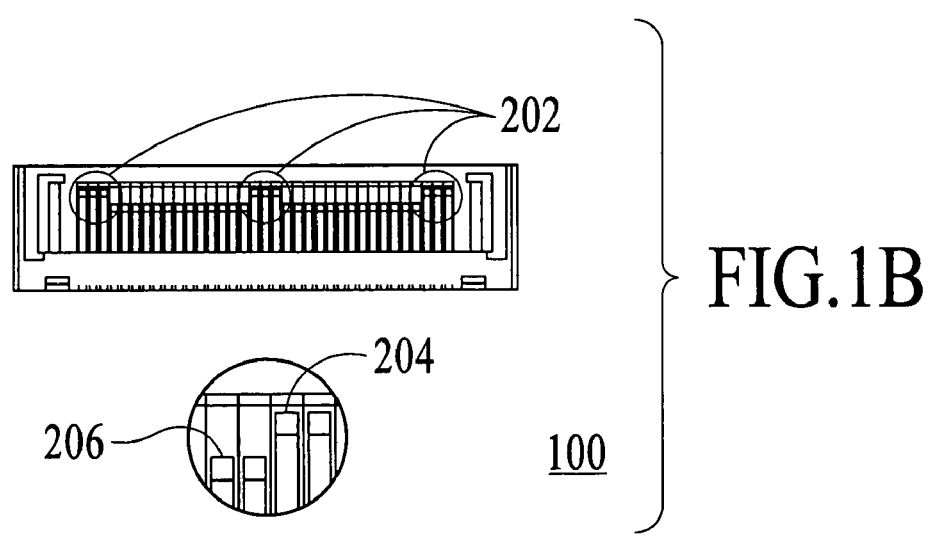

FIGS. 1A and 1B illustrate a docking connector 100 in accordance with the present invention. Referring first to FIG. 1A, the keying features 102 are of a custom length 104. In addition, a specific key arrangement where one set of keys are separated by one length are at the bottom and another set of keys are separated by another length at the top of the connector is used. The use of this key arrangement prevents noncompliant connectors from being plugged in and causing potential damage to the device. The connector for power utilizes a Firewire specification for power. The connector includes a first make/last break contact to implement this scheme. FIG. 1B illustrates the first make/last break contact 202 and also illustrates a ground pin and a power pin related to providing an appropriate first mate/last break contact. In this example, the ground pin 204 is longer than the power pin 206. Therefore, the ground pin 204 would contact its mating pin in the docking accessory before the power pin 206. Therefore internal electrical damage of the electronics of the device is minimized.

In addition, a connector interface system in accordance with the present invention uses both USB and Firewire interfaces as part of the same docking connector alignment, thereby making the design more compatible with different types of interfaces, as will be discussed in detail hereinafter. In so doing, more remote systems and devices can interface with the multi-communication device.

Remote Connector

Figure 2A:
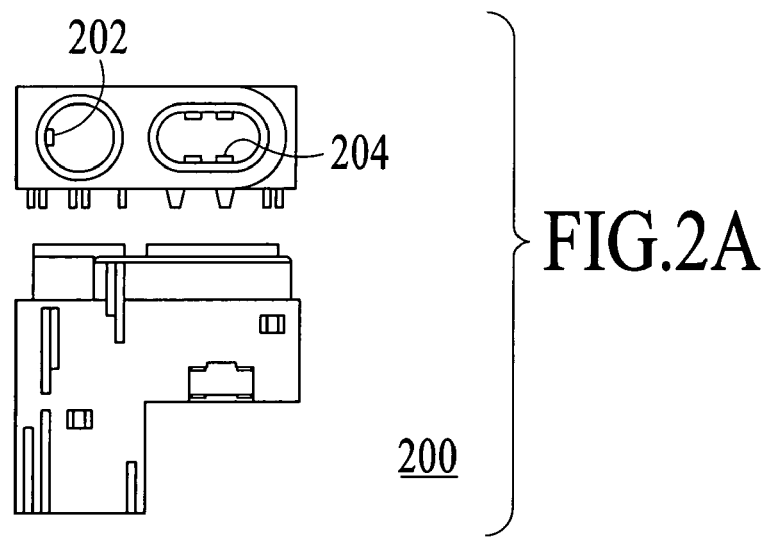
FIGS. 2A-2C illustrate the remote connector in accordance with the present invention.
Figure 2B:
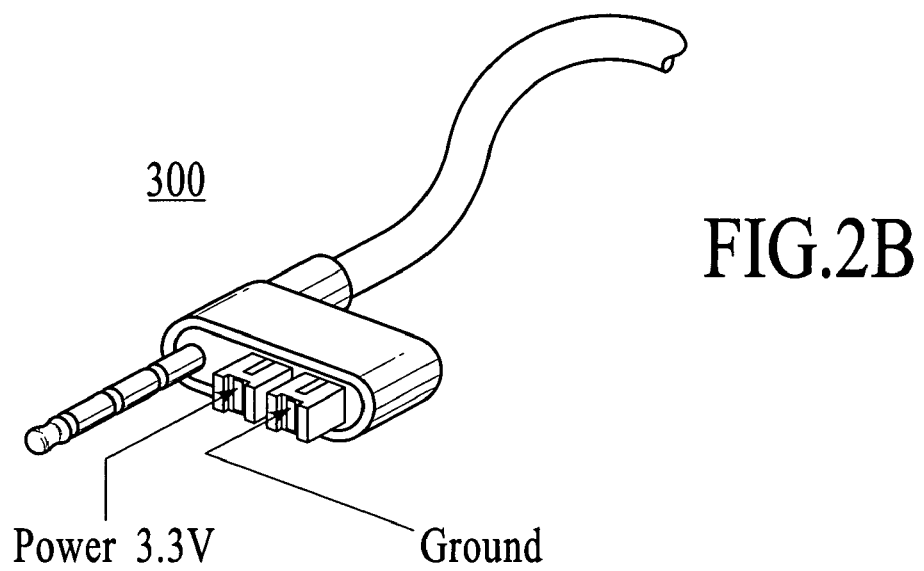
Figure 2C:
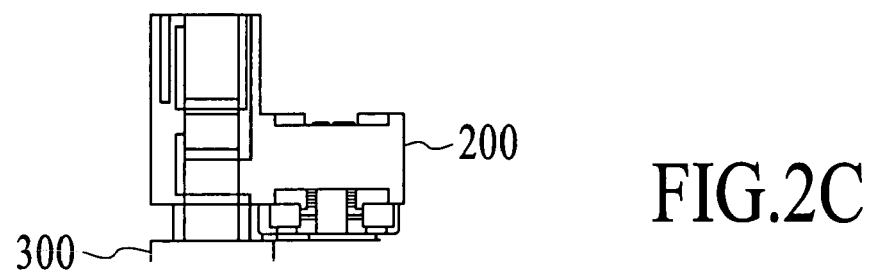

The connection interface system also includes a remote connector which provides for the ability to output audio, input audio, and output video using an I/O serial protocol. FIG. 2A is a front and top view of a remote connector 200 in accordance with the present invention. As is seen, the remote connector 200 includes a top headphone receptacle 202, as well as, a second receptacle 204 for remote devices. FIG. 2B illustrates a plug 300 to be utilized in the remote connector. The plug 300 allows the features to be provided via the remote connector. FIG. 2C illustrates the plug 300 inserted into the remote connector 200. Heretofore, all these features have not been implemented in a remote connector. Therefore, a standard headphone cable can be plugged in but also special remote control cables, microphone cables, video cables could be utilized with the remote connector.

Serial Protocol

The connector interface system also includes a serial protocol. The protocol is utilized to allow external devices to control the multi-communication device. These controls help a user sort and display for data more efficiently utilizing the device. A representation list of controls includes, but are not limited to:

Next album
Previous album
Next chapter
Previous chapter
Next play list
Previous play list
Shuffle setting advance
Repeat setting advance
Backlight for 30 seconds
Begin fast forward
Begin rewind To describe the features of the connector interface system in more detail, please find below a functional description of the docking connector, remote connector and a serial protocol in accordance with the present invention.

Docking and Remote Connector Specifications

For an example of the connector pin designations for both the docking connector and for the remote connector for a multi-communication device such as an iPod device by Apple Computer, Inc., refer now to FIGS. 3A and 3B. FIG. 3A illustrates the connector pin designations for the docking connector. FIG. 3B illustrates the connection pin designations for the remote connector.

Docking Connector Specifications

Figure 4A:
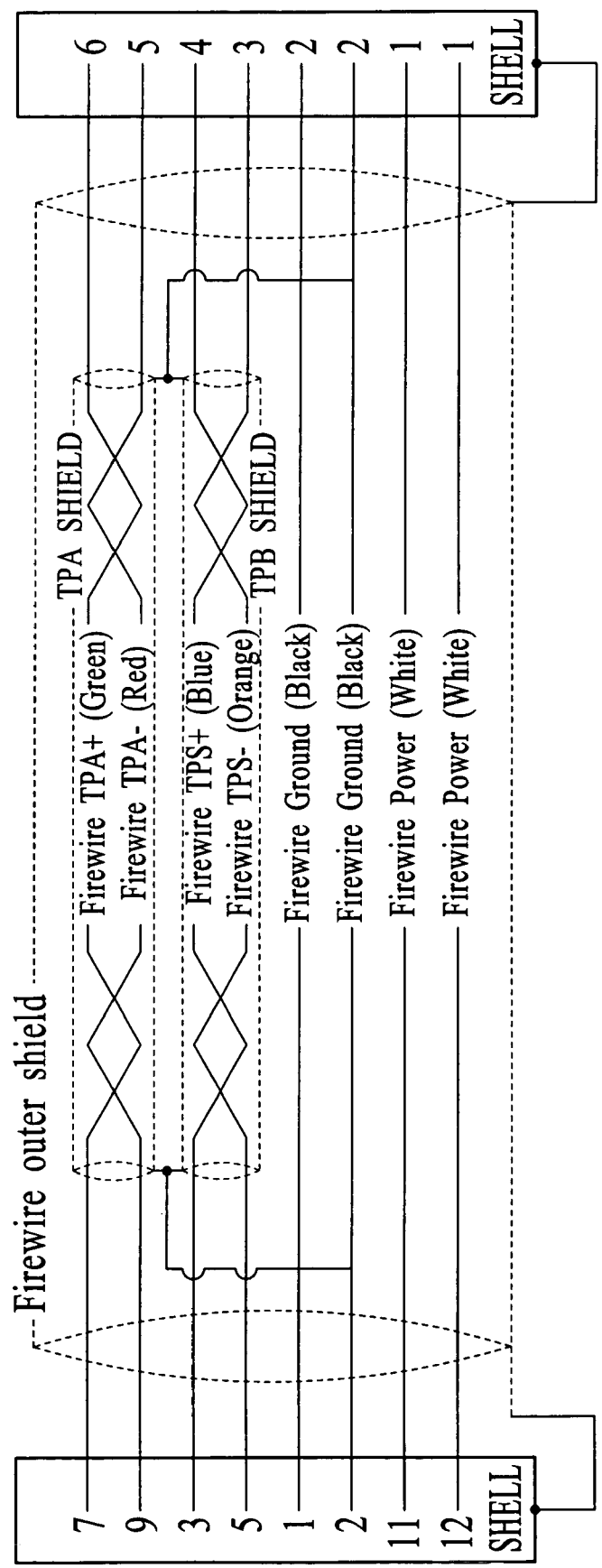
FIG. 4A illustrates the Firewire connector interface.

FIG. 4A illustrates a typical FireWire connector interface for the docking connector:

FireWire Power:
a) 8V-30V DC IN
b) 10 W Max
FireWire:
a) Designed to IEEE 1394 A Spec (400 Mb/s)

FIG. 4B illustrates the USB connector interface.
USB 2.0:
a) Designed to USB 2.0 High Speed Spec
b) The USB Power (pin 8 on the 30-pin connector) is not used for powering device;

only used to detect a USB host connection.

FIG. 4C illustrates a reference schematic diagram for accessory detect and identify system for detecting and identifying accessories for the docking connector. The system comprises:

a) A simple resistor to ground allows the device to determine what has been plugged into docking connector. There is an internal pullup on Accessory Identify.

b) Two pins required (Accessory Identify & Accessory Detect)

Serial Protocol Communication:
a) Two pins are used to communicate to and from device (Rx & Tx)

b) Input & Output (0V=Low; 3.3V=High)

c) A device with an identity resistor (ID #13) is a serial dock accessory.

A device coupled to the docking connector allows for a standard serial protocol to be utilized. Attaching a serial dock accessory makes any top-attached (remote connector) accessories inactive.

Line Level Input (Left & Right):
a) Stereo audio input b) Input Level 1V RMS (max)
a) Chassis ground is tied to specified pins
b) Digital ground should not be tied to Audio Return Remote Connector Specifications
Audio Out:
a) Stereo Output per channel volume controlled by device
Mono Mic In:
a) Mono mic in through Left channel
b) Filtered electret power supplied by internal device FIG. 4D is a reference schematic of an electret microphone that is within the remote connector.

Serial Protocol Communication:
a) Two pins used to communicate to and from device (Rx & Tx)
b) Input & Output (0V=Low, 3.3V=High)

Serial Protocol

Protocol Generalities

As previously mentioned, another feature of the present invention is the use of a serial protocol for allowing features to be implemented for remote devices. In a preferred embodiment, the protocol builds upon signaling protocol, such as the RS-232 serial specification. However, the signaling levels are nonstandard. In true RS-232, a mark is −7V and a space is 7V. In this protocol, a mark is 3.3V and a space is 0V. The signaling rate for this protocol is 19,200 bps. All signaling is at 8 bits data, no parity and one stop bit (8-N-1).

This protocol is to be used in both directions of a link. Every device is encouraged to implement both sending and receiving capabilities. It is be possible to determine the direction (host to device or device to host) of a packet from its contents only. This means that no packet is valid for sending from both the host and device.

All devices must be able to handle variable-length packets. For example, even though an identify packet currently has no defined data, a device must be able to understand an identify packet with data and should respond to the best of its ability. It must at least not lose sync to the packet signaling.

| Lingo Specifications | |
|---|---|
| Lingo | ID |
| General | 0x00 |
| Microphone | 0x01 |
| Simple Remote | 0x02 |
| Display Remote | 0x03 |
| RF transmitter | 0x05 |

The general lingo is shared for housekeeping commands across all devices. The microphone lingo is used by the remote connector on the multi-communication device. The simple remote lingo is used by a standard in-line remote control. The display remote lingo is reserved for a device with similar functionality to the standard remote but with a display for status.

General Lingo Specification

| Command | ID | Data Length |
| --- | --- | --- |
| Request identify | 0x00 | 0x00 |
| Identify | 0x01 | 0x01+ |

The host may send a request identify to the device to ask the device to reidentify itself.

The device sends an identify packet to identify itself. At this time multifunction (combo) devices are not supported. The identify data payload is thus the command ID 0x01 followed by a single byte of the same value as the lingo specification of the functionality the device implements unless specified otherwise. The identify packet returned in response to a request identify packet does not need to have the extra sync bytes and delays used during the startup process.

Simple Remote Lingo Specification

| Command | ID | Data Length |
| --- | --- | --- |
| Buttons status | 0x00 | 0x00+ |

A simple remote device sends a buttons status command to indicate an updated status of which buttons are held down. The data of the packet is a number of bytes indicating which buttons are currently held down. The bytes are made up by ORing the masks of the buttons together. The device will send a 0x00 in data (or no data) to indicate all buttons are released. While any buttons are held down the device should repeat this packet on a predetermined interval. If no packet of this sort is received by the host for 200 ms the host may assume a packet was lost and go to "all buttons up" mode.

A representative simple remote button map is shown below:

Simple Remote Button Mask

| Button | NumberByte | No. Mask |
| --- | --- | --- |
| Play/Pause | 0 | 0, 0x01 |
| Volume Up | 1 | 0, 0x02 |
| Volume Down | 2 | 0, 0x04 |
| Next Track | 3 | 0, 0x08 |
| Previous Track | 4 | 0, 0x10 |
| Next Album | 5 | 0, 0x20 |
| Previous Album | 6 | 0, 0x40 |
| Stop | 7 | 0, 0x80 |
| Play/Resume | 8 | 1, 0x01 |
| Pause | 9 | 1, 0x02 |
| Mute toggle | 10 | 1, 0x04 |
| Next Chapter | 11 | 1, 0x08 |
| Previous Chapter | 12 | 1, 0x10 |
| Next Playlist | 13 | 1, 0x20 |
| Previous Playlist | 14 | 1, 0x40 |
| Shuffle setting advance | 15 | 1, 0x80 |
| Repeat setting advance | 16 | 2, 0x01 |
| Power On | 17 | 2, 0x02 |
| Power Off | 18 | 2, 0x04 |
| Backlight for 30 seconds | 19 | 2, 0x08 |
| Begin FF | 20 | 2, 0x10 |
| Begin REW | 22 | 2, 0x20 |

The use of the button remote map allows for features that heretofore have not been utilized in multi-communication devices such as an iPod device manufactured by Apple Computer, Inc.

A connector interface system for a communication device is disclosed. The interface includes a docking connector. The docking connector includes first make/last break contacts that minimize internal damage to the internal electronics. The docking connector also includes specific keying arrangement to prevent noncompliant connectors from being plugged in, and thereby minimizes potential damage to the multi-communication device. The remote connector provides for the ability to output audio, input audio, and output video using an I/O serial protocol. The connector interface also includes a serial protocol to control device features. These controls help a user sort and search for data more efficiently within the device.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A connector interface system for communicating with a multi-communication device, the connector interface system comprising:
   a connector system for receiving a plurality of signal, wherein the connector system comprises a first connector, the first connector comprising:
   a plurality of contacts configured to carry the plurality of signals; and
   a keying mechanism that is configured to prevent a noncompliant connector from engaging the first connector; and
   a serial protocol which allows for controls to help a user sort and search for data within the multi-communication device, wherein the connector system interfaces with the controls to allow for at least one of the following functions of the multi-communication device: Shuffle setting advance, Begin fast forward, and Begin rewind.

2. The connector interface system of claim 1 wherein the functions of the multi-communication device further comprise Repeat setting advance.

3. The connector interface of claim 2 wherein the functions of the multi-communication device further comprise: Next album, Previous album, Next chapter, Previous chapter, Next play list, Previous play list, and Backlight for a predetermined period of time.

4. The connector interface system of claim 1 wherein the keying mechanism of the first connector comprises a first set of keys that are spaced apart by a first predetermined distance.

5. The connector interface system of claim 1 wherein the plurality of contacts include a first plurality of contacts configured to carry universal serial bus (USB) signals.

6. The connector interface system of claim 1 wherein the serial protocol comprises a predetermined signaling protocol.

7. The connector interface system of claim 1 wherein the first connector electrically couples to a docking connector of the multi-communication device.

8. The connector interface system of claim 4 wherein the keying mechanism of the first connector further comprises a second set of keys that are spaced apart by a second predetermined distance that is different than the first predetermined distance.

9. A connector interface system for an accessory device configured to connect with a multi-communication device, the connector interface system comprising:
- a connector system for receiving a plurality of signals; and
- a serial protocol which allows for controls to help a user sort and search for data within the multi-communication device,
- wherein the connector system interfaces with the controls to allow for at least one of the following functions of the multi-communication device: Shuffle setting advance, Begin fast forward, and Begin rewind, and
- wherein the connector system comprises a first connector, the first connector comprising an accessory identify contact pin and an accessory detect contact pin, wherein when the accessory device is connected to the multi-communication device, the accessory identify contact pin and the accessory detect contact pin operate to identify the accessory device for the multi-communication device.

10. The connector interface system of claim 9 wherein the accessory device is identified when the accessory detect contact pin is coupled to ground and a resistor of predetermined value is coupled between the accessory identify and accessory detect contact pins.

11. A connector interface system for communicating with a multi-communication device, the connector interface system comprising:
- a connector system for receiving a plurality of signals; and
- a serial protocol which allows for controls to help a user sort and search for data within the multi-communication device,
- wherein the connector system interfaces with the controls to allow for at least one of the following functions of the multi-communication device: Shuffle setting advance, Begin fast forward, and Begin rewind, and
- wherein the serial protocol comprises a predetermined signaling protocol that is based on a modified RS-232 serial specification.

12. The connector interface system of claim 11 wherein the predetermined signaling protocol defines a mark by a signal that is 3.3 V or less, and a space by a signal that is about 0V.

13. The connector interface system of claim 11 wherein the predetermined signaling protocol is bidirectional.

14. The connector interface system of claim 11 wherein the serial protocol comprises a plurality of lingoes, each lingo comprising a plurality of commands that implement the controls.

15. The connector interface system of claim 13 wherein the serial protocol comprises a plurality of packets, wherein contents of a packet determine whether the packet is being transmitted from the multi-communication device to an accessory device or vice versa.

16. A connector interface system for communicating with a multi-communication device, the connector interface system comprising:
- a connector system for receiving a plurality of signals; and
- a serial protocol which allows for controls to help a user sort and search for data within the multi-communication device,
- wherein the connector system interfaces with the controls to allow for at least one of the following functions of the multi-communication device: Shuffle setting advance, Begin fast forward, and Begin rewind, and
- wherein the serial protocol comprises a predetermined signaling protocol that has a signaling rate of about 19,200 bits per second.

17. A connector interface system for communicating with a multi-communication device, the connector interface system comprising:
- a connector system for receiving a plurality of signals; and
- a serial protocol which allows for controls to help a user sort and search for data within the multi-communication device,
- wherein the connector system interfaces with the controls to allow for at least one of the following functions of the multi-communication device: Shuffle setting advance, Begin fast forward, and Begin rewind,
- wherein the serial protocol comprises a plurality of lingoes, each lingo comprising a plurality of commands that implement the controls, and
- wherein the plurality of lingoes comprises a general lingo, a simple remote lingo and an RF transmitter lingo.

18. The connector interface system of claim 17 wherein the general lingo comprises a request identify command and an identify command, wherein the request identify command may be received by an accessory device from the multi-communication device, the request identify command requesting identification of the accessory device, and the identify command may be sent by the accessory device to the multi-communication device.

19. The connector interface system of claim 17 wherein the simple remote lingo comprises a buttons status command, wherein the button status command indicates an updated status of which buttons on the multi-communication device are held down.

20. The connector interface system of claim 17 wherein the plurality of lingoes further comprises a microphone lingo and a display remote lingo.

21. The connector interface system of claim 19 wherein the functions Play/Pause, Begin fast forward and Begin rewind have corresponding button states.

22. A connector interface system for communicating with a multi-communication device, the connector interface system comprising:
- a connector system for receiving a plurality of signals; and
- a serial protocol which allows for controls to help a user sort and search for data within the multi-communication device,
- wherein the connector system interfaces with the controls to allow for at least one of the following functions of the multi-communication device: Shuffle setting advance, Begin fast forward, and Begin rewind,
- wherein the connector system comprises a connector that is configured to electrically couple to a docking connector of the multi-communication device, and
- wherein the connector comprises a plurality of pins designated to carry a plurality of signals, the plurality of signals comprising: USB signals, accessory identify and accessory detect signals, and audio and video signals.

23. The connector interface system of claim 22 wherein the connector further comprises one or more pins designated to carry power.

* * * * *